United States Patent
Ganev et al.

(10) Patent No.: US 12,340,432 B2
(45) Date of Patent: Jun. 24, 2025

(54) SYSTEM FOR DETERMINING TYPE OF PROPERTY INSPECTION BASED ON CAPTURED IMAGES

(71) Applicant: Allstate Insurance Company, Northbrook, IL (US)

(72) Inventors: Ivan S. Ganev, Deerfield, IL (US); James M. Berends, Buffalo Grove, IL (US)

(73) Assignee: Allstate Insurance Company, Northbrook, IL (US)

(*) Notice: Subject to any disclaimer, the term of this patent is extended or adjusted under 35 U.S.C. 154(b) by 0 days.

(21) Appl. No.: 18/136,503

(22) Filed: Apr. 19, 2023

(65) Prior Publication Data

US 2023/0410232 A1  Dec. 21, 2023

Related U.S. Application Data

(63) Continuation of application No. 17/341,833, filed on Jun. 8, 2021, now Pat. No. 11,657,464, which is a
(Continued)

(51) Int. Cl.
  *G06Q 50/16* (2024.01)
  *G06Q 30/02* (2023.01)
  (Continued)

(52) U.S. Cl.
  CPC ......... *G06Q 50/16* (2013.01); *G06Q 30/0278* (2013.01); *G06T 7/0004* (2013.01); *H04N 23/00* (2023.01); *G06T 2207/30108* (2013.01)

(58) Field of Classification Search
  CPC .. G06Q 50/16; G06Q 30/0278; G06T 7/0004; G06T 2207/30108; H04N 5/225
  See application file for complete search history.

(56) References Cited

U.S. PATENT DOCUMENTS

| 7,596,542 B1 | 9/2009 | Woll |
| 7,974,854 B1 * | 7/2011 | Bradley ............ G06Q 30/0278 705/1.1 |

(Continued)

FOREIGN PATENT DOCUMENTS

| CA | 2856936 A1 | 1/2015 |
| CA | 2856938 A1 | 1/2015 |
| WO | WO-2009074783 A1 | 6/2009 |

OTHER PUBLICATIONS

Dec. 2, 20187 (US) Final Office Action—U.S. Appl. No. 15/071,365, 37 Pages.
(Continued)

*Primary Examiner* — Andrew Chase Lakhani
(74) *Attorney, Agent, or Firm* — Polsinelli PC

(57) ABSTRACT

Systems and methods are disclosed for electronically detecting and determining a type of inspection to recommend for a property and/or one or more characteristics of the property using input from multiple computing devices, such as image capturing devices, mobile devices, external data sources, internal data sources, and/or other data sources. A computing device may receive, via a communication interface, a plurality of images of a property. The computing device may determine, based on the plurality of images of the property, a score indicative of a level of care of the property. The computing device may determine, based on the plurality of images of the property, an estimate of a value of the property. Based on the determined score indicative of the level of care of the property and the determined estimate of the value of the property, the computing device may determine a recommendation for a type of inspection to perform on the property. The computing device may send, via the communication interface, the recommendation for the type of inspection for display on a display of a user device.

12 Claims, 4 Drawing Sheets

Related U.S. Application Data continuation of application No. 15/071,365, filed on Mar. 16, 2016, now Pat. No. 11,037,255.

(51) Int. Cl.
*G06T 7/00* (2017.01)
*H04N 23/00* (2023.01)

(56) References Cited

U.S. PATENT DOCUMENTS

| | | | |
|---|---|---|---|
| 8,046,306 B2 | 10/2011 | Stinson | |
| 8,651,206 B2 | 2/2014 | Slawinski et al. | |
| 8,760,285 B2 | 6/2014 | Billman et al. | |
| 8,774,471 B1 | 7/2014 | Laaser et al. | |
| 8,775,219 B2 | 7/2014 | Swanson et al. | |
| 8,818,572 B1 | 8/2014 | Tofte et al. | |
| 9,152,863 B1 | 10/2015 | Grant | |
| 9,505,494 B1* | 11/2016 | Marlow | G05D 1/0011 |
| 9,869,481 B2 | 1/2018 | Shiel | |
| 9,875,509 B1* | 1/2018 | Harvey | G06T 17/20 |
| 10,163,162 B1* | 12/2018 | Devereaux | G06Q 40/08 |
| 10,572,947 B1 | 2/2020 | Berends et al. | |
| 10,977,734 B1* | 4/2021 | Kenney | G06Q 40/08 |
| 11,003,334 B1* | 5/2021 | Conway | G06Q 40/08 |
| 2007/0136077 A1* | 6/2007 | Hammond | G06Q 30/0278 705/306 |
| 2008/0114655 A1 | 5/2008 | Skidmore | |
| 2008/0159616 A1 | 7/2008 | Fellinger | |
| 2009/0006185 A1* | 1/2009 | Stinson | G06Q 30/02 705/306 |
| 2009/0204447 A1 | 8/2009 | Tucker et al. | |
| 2009/0216552 A1 | 8/2009 | Watrous | |
| 2009/0265193 A1 | 10/2009 | Collins et al. | |
| 2010/0296694 A1* | 11/2010 | Little | G01K 17/00 382/100 |
| 2011/0025851 A1 | 2/2011 | Rumble | |
| 2011/0153368 A1 | 6/2011 | Pierre et al. | |
| 2012/0232938 A1 | 9/2012 | Jones et al. | |
| 2013/0031011 A1 | 1/2013 | Lee et al. | |
| 2014/0278582 A1 | 9/2014 | Shambach et al. | |
| 2014/0310014 A1 | 10/2014 | Banerjee et al. | |
| 2014/0310188 A1 | 10/2014 | Preuss et al. | |
| 2014/0351014 A1 | 11/2014 | Lopez | |
| 2014/0368507 A1 | 12/2014 | Altman et al. | |
| 2015/0074002 A1 | 3/2015 | Johnson | |
| 2015/0088556 A1 | 3/2015 | Convery et al. | |
| 2015/0213315 A1 | 7/2015 | Gross | |
| 2016/0027051 A1 | 1/2016 | Gross | |
| 2016/0284075 A1* | 9/2016 | Phan | H04N 23/698 |
| 2017/0193829 A1* | 7/2017 | Bauer | G05D 1/0038 |
| 2017/0199647 A1* | 7/2017 | Richman | G08G 5/0069 |
| 2018/0130196 A1* | 5/2018 | Loveland | H04N 7/185 |
| 2018/0336650 A1* | 11/2018 | Jessen | G06Q 50/16 |
| 2019/0019261 A1 | 1/2019 | Lammert, Jr. et al. | |

OTHER PUBLICATIONS

May 30, 2018—(US) Non-Final Office Action—U.S. Appl. No. 15/071,365, 51 Pages.
Apr. 5, 2019—(US) Non-Final Office Action—U.S. Appl. No. 15/071,365, 23 Pages.
Oct. 10, 2019—(US) Final Office Action—U.S. Appl. No. 15/071,365, 27 Pages.
Mar. 31, 2020—(US) Non-Final Office Action—U.S. Appl. No. 15/071,365, 26 Pages.
Sep. 9, 2020—(US) Final Office Action—U.S. Appl. No. 15/071,365, 39 Pages.
Feb. 16, 2021—(US) Notice of Allowance—U.S. Appl. No. 15/071,365, 13 Pages.
"3D Scanners—A Guide to 3D Scanner Technology," Geomagic, Jan. 27, 2016, 3 pages.
"Erie Insurance Uses Drone to Inspect Roof Damage," Published on Oct. 1, 2015, Retrieved from the Internet: https://www.youtube.com/vatchv=j_tchQbgo2g, 1 page.
"Explore Google Street View," Explore Street View, Jan. 27, 2016, 5 pages.
"Google Street View," Wikipedia, the Free Encyclopedia, Jan. 27, 2016, 8 pages.
Holmsten D., "Thermographic Study of Transient Heat-Flow in Residential Dwellings," Proceedings of SPIE, Thermosense III, vol. 254, 1980, Retrieved from URL: https://www.spiedigitallibrary.org/conference-proceedings-of-spie, Retrieved on Jan. 19, 2021, 15 pages.
Madaio M., et al., "Firebird: Predicting Fire Risk and Prioritizing Fire Inspections in Atlanta," KDD'16, Feb. 29, 2016, 10 pages.
Moritz M., "Home Inspectors Using Drones: Unmanned Aircraft Provide Birds-Eye View of Rooftops," Long Horn Recycling, Apr. 7, 2015, 6 pages.
"Rebate Realty USA—Buyer Beware! The Importance of Home Inspections," Properties by Linda, 4 pages.
Roche J., "Have Home Inspections Reached a Tipping Point?," Verisk Analytics, Dec. 14, 2015, 3 pages.
"Thermographic Inspections—Energy Saver," Department of Energy, Retrieved from URL: https://www.energy.gov/energysaver/hermographic-Inspections, Retrieved on Jan. 19, 2021, 5 pages.

* cited by examiner

SYSTEM FOR DETERMINING TYPE OF PROPERTY INSPECTION BASED ON CAPTURED IMAGES

CROSS-REFERENCE TO RELATED APPLICATIONS

This application is a continuation of U.S. patent application Ser. No. 17/341,833 filed Jun. 8, 2021, which is a continuation of U.S. patent application Ser. No. 15/071,365 filed Mar. 16, 2016. Each of these applications is incorporated by reference in its entirety herein.

TECHNICAL FIELD

Aspects of the disclosure generally relate to electronically detecting and determining a type of inspection to recommend for a property and/or one or more characteristics of the property using input from multiple computing devices, such as image capturing devices, mobile devices, external data sources, internal data sources, and/or other data sources.

BACKGROUND

Walk-through inspections of property, such as houses and land, are prevalent in the real estate industry. For example, an insurance provider may inspect property to determine whether to insure the property, an appropriate level of coverage, or the like. On the other hand, some insurance providers may forego the inspection all together and simply insure the property.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to a system for electronically detecting and determining a type of inspection to recommend for a property and/or one or more characteristics of the property. The system may have a first computing device comprising a camera configured to capture images, a transmitter configured to transmit images captured by the camera, a first processor, and first memory. The first memory may store computer-executable instructions that, when executed by the first processor, cause the first processor of the first computing device to capture, using the camera of the first computing device, a plurality of images of a property. The transmitter of the first computing device may be used to transmit the plurality of images of the property to a second computing device. The second computing device may comprise a communication interface, a second processor, and second memory. The second memory may store computer-executable instructions that, when executed by the second processor, cause the second processor of the second computing device to receive, via the communication interface, the plurality of images of the property transmitted by the first computing device. Based on the plurality of images of the property, the second computing device may determine a score indicative of a level of care of the property. The second computing device may also determine, based on the plurality of images of the property, an estimate of a value of the property. Based on the determined score indicative of the level of care of the property and the determined estimate of the value of the property, the second computing device may determine a recommendation for a type of inspection to perform on the property. The second computing device may send, via the communication interface, the recommendation for the type of inspection for display on a display.

In some aspects, the first computing device may comprise the display, and the second memory may store additional computer-executable instructions that, when executed by the second processor, cause the second processor of the second computing device to generate a user interface indicating the recommendation for the type of inspection. Sending the recommendation may comprise sending the user interface indicating the recommendation for the type of inspection for display on the display of the first computing device.

Sending the recommendation for the type of inspection may be performed in response to a determination that the first computing device is at a location of the property. In some aspects, the first computing device may comprise an automated image capturing device, and the second memory may store additional computer-executable instructions that, when executed by the second processor, causes the second processor of the second computing device to determine that the automated image capturing device is at a location of the property. In response to determining that the automated image capturing device is at a location of the property, the second computing device may transmit an instruction to the automated image capturing device to capture one or more additional images of the property.

In some aspects, the plurality of images of the property may comprise at least one image of a roof of a structure on the property and at least one image of an exterior wall of the structure. Determining the estimate of a value of the property may comprise determining at least one dimension of the roof based on the at least one image of the roof, determining, based on the at least one dimension of the roof and the image of the exterior wall, an estimate of a total area of an interior of the structure, and determining the estimate of the value of the property based on the estimate of the total area of the interior of the structure.

In some aspects, determining the score indicative of a level of care of the property comprises may comprise determining a level of care of one or more structures of the property and a level of care of one or more features of the property surrounding the structures. The type of inspection to perform on the property may comprise an inspection of an exterior of a structure of the property and an interior of the structure, or an inspection of the exterior of the structure of the property and not the interior of the structure.

Systems, non-transitory computer readable media, and/or methods described herein may comprise receiving, via a communication interface of a computing device, a plurality of images of a property. The computing device may determine, based on the plurality of images of the property, a score indicative of a level of care of the property. The computing device may determine, based on the plurality of images of the property, an estimate of a value of the property. Based on the determined score indicative of the level of care of the property and the determined estimate of the value of the property, the computing device may determine a recommendation for a type of inspection to perform on the property. The computing device may send, via the communication interface of the computing device, the recommendation for the type of inspection for display on a display of a user device.

In some aspects, receiving the plurality of images of the property may comprise receiving the plurality of images of the property from the user device. The method may further comprise generating a user interface indicating the recommendation for the type of inspection. Sending the recommendation may comprise sending the user interface indicating the recommendation for the type of inspection for display on the display of the user device.

In some aspects, receiving the plurality of images of the property may comprise receiving the plurality of images of the property from the user device, and sending the recommendation for the type of inspection is performed in response to a determination that the user device is at a location of the property. Receiving the plurality of images of the property may comprise receiving the plurality of images of the property from an automated image capturing device. The method may further comprise determining, by the computing device, that the automated image capturing device is at a location of the property. In response to determining that the automated image capturing device is at a location of the property, an instruction may be transmitted to the automated image capturing device to capture one or more additional images of the property.

The plurality of images of the property comprises at least one image of a roof of a structure on the property and at least one image of an exterior wall of the structure. Determining the estimate of a value of the property may comprise determining, by the computing device, at least one dimension of the roof based on the at least one image of the roof, determining, by the computing device and based on the at least one dimension of the roof and the image of the exterior wall, an estimate of a total area of an interior of the structure, and determining, by the computing device, the estimate of the value of the property based on the estimate of the total area of the interior of the structure.

In some aspects, determining the score indicative of a level of care of the property may comprise determining a level of care of one or more structures of the property and a level of care of one or more features of the property surrounding the structures. The type of inspection to perform on the property may comprise an inspection of an exterior of a structure of the property and an interior of the structure, or an inspection of the exterior of the structure of the property and not the interior of the structure.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Aspects may take the form of a computing device configured to perform specified actions. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
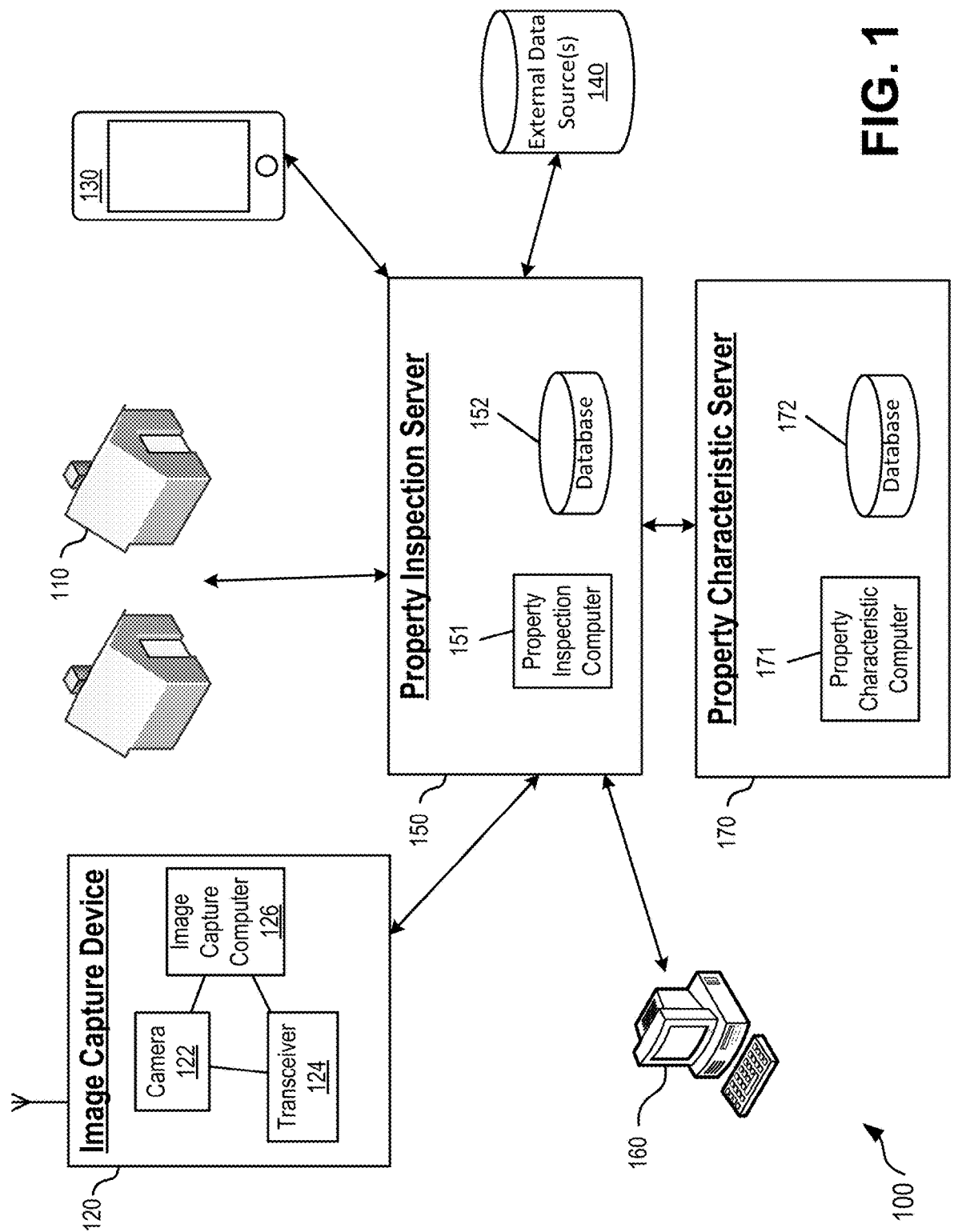
FIG. 1 is a diagram illustrating various example components of a system for determining a type of property inspection and/or property value based on captured images according to one or more aspects of the disclosure.

FIG. 1 is a diagram illustrating various example components of a system 100 for determining a type of property inspection and/or property value based on captured images according to one or more aspects of the disclosure. The property inspection system 100 may include one or more properties 110 (e.g., houses, land, apartments, condominiums, or any other type of property that can be insured), one or more image capture devices 120, one or more mobile devices 130 (e.g., a smartphone, a tablet, and the like), one or more external data source(s) 140, a property inspection server 150, a property characteristic determination server 170, and additional related components. Each component of the property inspection system 100 may include a computing device (or system) having some or all of the following structural components.

For example, the property inspection computer or computing device 151 may have a processor for controlling overall operation of the computing device 151 and its associated components, including RAM, ROM, input/output module, and memory. The computing device 151, along with one or more additional devices (e.g., property characteristic determination computing device 171), may correspond to any of multiple systems or devices, such as property inspection computing devices or systems, configured as described herein for receiving data associated with the property (e.g., image data, claims data, etc.), determining the type of inspection to perform on the property and/or the property value, and sending various instructions based on the determination. Image data can include image data collected from image capture devices 120, mobile devices (e.g., mobile device 130), external data sources 140, or internal data sources 152 or 172.

The property inspection computer 151 may include an Input/Output (I/O) module having a microphone, keypad, touch screen, and/or stylus through which a user of the computing device 151 may provide input, and may also include one or more of a speaker for providing audio input/output and a video display device for providing textual, audiovisual and/or graphical output. Software may be stored within the memory of the property inspection computer and/or other storage to provide instructions to its processor for enabling device 151 to perform various functions. For example, the computing device's memory may store software used by the device 151, such as an operating system, application programs, and an associated internal or external database 151. The memory unit may include one or more of volatile and/or non-volatile computer memory to store computer-executable instructions, data, and/or other information. The processor of the computer 151 and its associated components may allow the property inspection computer 151 to execute a series of computer-readable instructions to receive data associated with the property (e.g., image data, claims data, etc.), determine the type of inspection to perform on the property and/or the value of the property, and send various instructions based on the determination. One or more application programs used by the property inspection computing device 151 may include computer executable instructions (e.g., image data analysis programs, property inspection type algorithms, and the like) for receiving image data and determining an inspection type and performing other related functions as described herein.

The property inspection computing device 151 may operate in a networked environment supporting connections to one or more remote computers, such as various other terminals/devices (e.g., terminal 160, which may include a display). The property inspection computing device 151, and the related terminals/devices, may communicate with image capture devices 120, mobile devices 130, external data sources 140, or other sources that may have data relevant to the property in question. Thus, the property inspection computing device 151 and its associated terminals/devices may each include personal computers (e.g., laptop, desktop, or tablet computers) and/or servers (e.g., web servers, database servers) and may communicate with stand-alone image capturing devices, or mobile communication devices (e.g., mobile phones, portable computing devices, and the like).

The devices illustrated in system 100 may communicate via network connections depicted such as a local area network (LAN) and a wide area network (WAN), and a wireless telecommunications network, but may also include other networks. When used in a LAN networking environment, the property inspection computing device 151 may be connected to the LAN through a network interface or adapter. When used in a WAN networking environment, the device 151 may include a modem or other means for establishing communications over the WAN, such as a network (e.g., the Internet). When used in a wireless telecommunications network, the device 151 may include one or more transceivers, digital signal processors, and additional circuitry and software for communicating with wireless computing devices (e.g., mobile phones, image capture devices) via one or more network devices (e.g., base transceiver stations) in the wireless network. It will be appreciated that the network connections shown and described above are illustrative and other means of establishing a communications link between the computers may be used. The existence of any of various network protocols such as TCP/IP, Ethernet, FTP, HTTP and the like, and of various wireless communication technologies such as GSM, CDMA, Wi-Fi, and WiMAX, is presumed, and the various computing devices and property inspection system components described herein may be configured to communicate using any of these network protocols or technologies.

The system 100 may include a property characteristic determination server 170 having a property characteristic determination computer 171 and a database 172. In some aspects, the property inspection server 150 may be configured to determine the type of inspection to recommend for the property, whereas the property characteristic determination server 170 may be configured to determine one or more characteristics of the property, such as an estimate of the value of the property. In alternative aspects, one server may be configured to both determine the type of inspection to recommend and the estimate of the value of the property. The property characteristic determination computer 171 may have one or more of the same computing components as the property inspection computer 151 described above.

The system 100 may also include an image capture device 120, containing some or all of the hardware/software components of the computing device 151 described above. The image capture device 120 may have one or more cameras 122. The image capture device 120 may comprise, for example, an imaging device on the road (e.g., a standalone camera, a camera integrated in a traffic light, a security camera, a camera on a vehicle, and the like) or an imaging device in the air (e.g., a camera on a drone, a helicopter, an airplane, a satellite, or any other aerial or space vehicle, whether manned or unmanned). The image capture device 120 may also include a transceiver 124 for transmitting and receiving image data, and an image capture computer 126 used to process image data and to determine data to send to the property inspection server 150.

The system 100 may include one or more mobile computing device 130 (e.g., mobile phones, personal digital assistants (PDAs), tablet computers, laptop computers, smartwatches, etc.). The mobile computing device 130 may contain some or all of the hardware/software components of the computing device 151 described above. Software applications executing on the mobile device 130 may be configured to receive image data from one or more cameras or other imaging devices on the mobile computing device 130.

The data collected by the mobile device 130 may be stored and/or analyzed within the mobile device 130. The processing components of the mobile computing device 130 may be used to analyze image data and transmit, via a wired or wireless transmission network, the image data to one or more external devices for storage or analysis, such as the property inspection server 150. The mobile device 130 may also have a display configured to display property inspection recommendations and user interfaces sent by the property inspection server 150, as will be described in further detail in the examples below. The workstation 160 (or other user device) may also have a display configured to display property inspection recommendations and user interfaces sent by the property inspection server 150.

The system 100 may comprise one or more external data sources 140. Each external data source 140 may comprise one or more database storing image data (e.g., photographs, topographical images, thermal images, and the like). The databases of the external data sources 140 may also store real estate information, claims information, and other information associated with the property 110, surrounding properties, or similar properties. Data from the external data sources 140 may be accessed via, for example, open application program interfaces (APIs), databases, software development kits (SDKs), and/or mobile device to mobile device communication.

Figure 2:
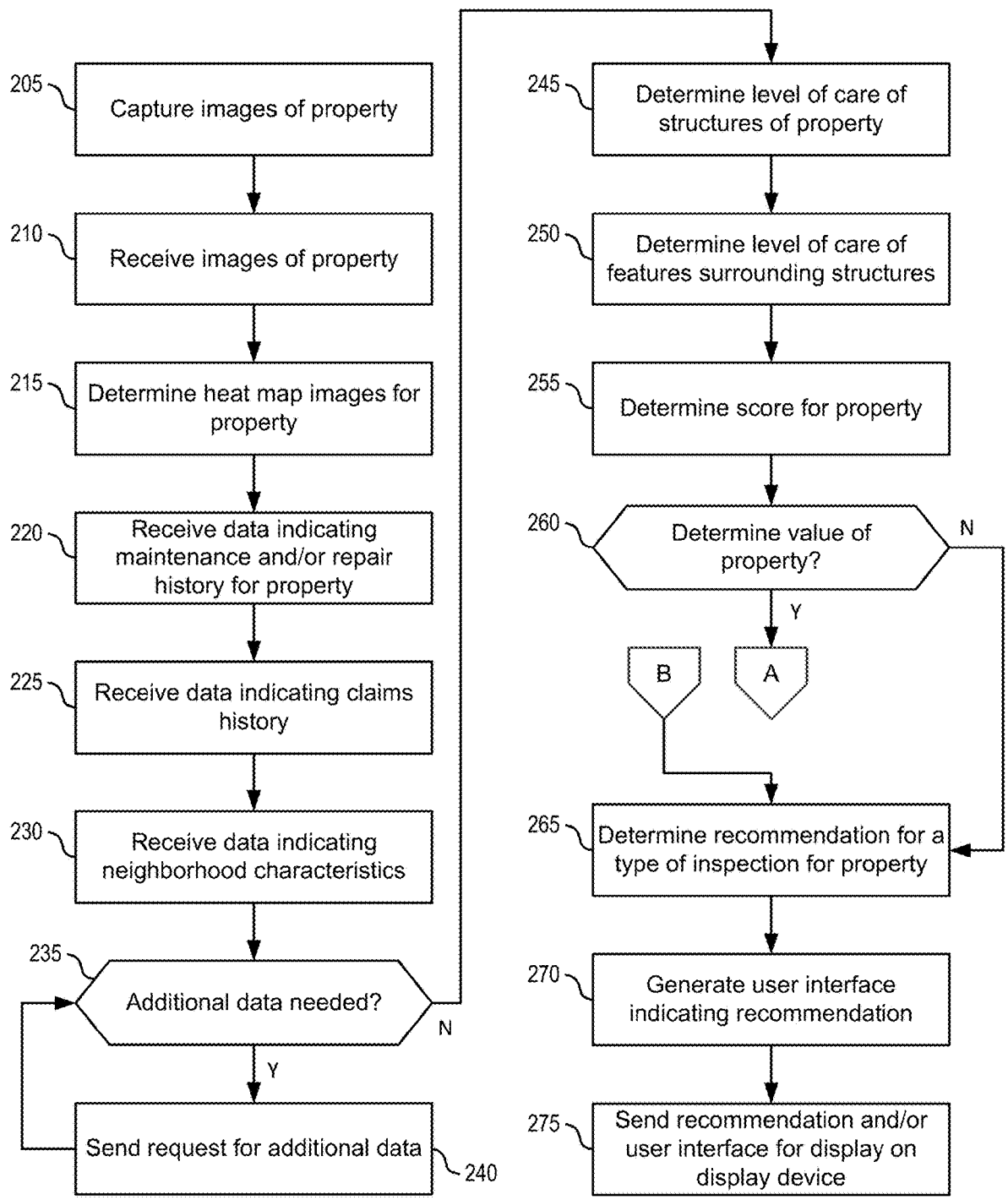
FIG. 2 is a flow diagram illustrating an example method of determining a type of property inspection and/or property value based on captured images according to one or more aspects of the disclosure.

FIG. 2 is a flow diagram illustrating an example method of determining a type of property inspection and/or value of the property based on captured images according to one or more aspects of the disclosure. The steps illustrated in FIG. 2 may be performed by one or more of the devices illustrated in FIG. 1, such as the image capture device 120, the mobile device 130, or the property inspection server 150.

In step 205, an image capturing device, such as a camera, may be used to capture images of a property. The image capturing device may be part of a satellite, airplane, drone, car, and the like. For example, the captured images may comprise one or more photographs of the exterior of the property, such as a home. The images may be captured from the top of the property, such as by a satellite (e.g., satellite imagery), an airplane, a drone, etc. The images captured from the top of the property may show the roof of a home on the property, the front yard of the property, the back yard of the property, the roof of a garage on the property, a porch on the property, a deck on the property, and the like. In some aspects, the images captured from above the property may be converted into topographical images showing features on the property, elevation of different areas of the property, and the like.

The images may be captured from the side of the property, such as from the street, alley, sidewalk, a home across the street, back yard, front yard, or any other location accessible by, for example, a vehicle, a robot, a bicycle, a person, and the like. For example, an image of the front of the home and/or front yard may be captured from the street in front of the home. Similarly, an image of the back of the home and/or back yard may be captured from the alley at the rear of the home. Various other images of the exterior of the home may similarly be captured. As will be described in further detail below, the captured images of the property may be used by the computing device to evaluate the exterior condition of the property (including a home, yards, garage, etc.). The computing device may use the evaluation of the condition to recommend a type of inspection for the property, such as a full inspection, a partial inspection (e.g., a virtual inspection), or no inspection. The image capturing device(s) described herein may be dispatched by an insurance company determining the type of inspection for the property. The insurance company may also determine whether to insure the property based on one or more inspections.

In step 210, a computing device may receive images of the property. For example, the computing device may receive the images captured in step 205. The computing device may additionally or alternatively receive images available from external data sources (e.g., databases, websites, and the like), such as a government data source (e.g., real estate tax records, which may include images or other descriptions of the property), a real estate data source (e.g., a physical real estate company's database of property listings, or a web-based real estate company's database of property listings), a property valuation data source (e.g., an online property valuation system), a web mapping data source, or any other external data sources. Accordingly, the computing device may be used to view and evaluate the property electronically via the images received by the computing device.

In step 215, the computing device may determine one or more heat map images for the property (or otherwise use heat map information). One or more of the images captured in step 205 and/or received by the computing device in step 210 may include thermal images (e.g., heat map images, such as infrared images). The thermal images may be used to indicate heat leakage from a structure, such as a house. An infrared image may also be used to determine the age of the roof of the structure. The heat map images may indicate the level of care (e.g., maintenance) of the property and be used to determine whether to recommend a full inspection, partial inspection, or no inspection of the property. For example, a building losing a lot of heat (e.g., greater than a threshold heat loss) may be indicative of poor maintenance of the building. As another example, an older roof (e.g., greater than a threshold roof age) may be indicative of a greater potential for damage or other problems with the home.

In step 220, the computing device may receive data indicating maintenance and/or repair history for the property. The computing device may query external or internal data sources to determine when maintenance or repair work was performed on the property, the cost of the maintenance or repair work, and the extent of the maintenance or repair work.

In step 225, the computing device may receive data indicating claims history for the property. The computing device may access internal insurance claims information for the property, which may indicate when claims were submitted, how much was claimed, the frequency that claims were submitted, whether the claims were approved, and other claims information. The computing device may also access external data sources for claim history information, such as if the property was previously insured by a different insurance company.

In step 230, the computing device may receive data indicating characteristics of the neighborhood of the property. The computing device may query external or internal data sources to determine, for example, the crime rate of the neighborhood, the types of crimes that occurred (e.g., personal vs. property crime), the school district, the walkability, the available public transportation options, and the like. Exemplary external data sources include government data sources, real estate data sources, property valuation data sources, and the like.

In step 235, the computing device may determine whether additional data is needed. If additional data is needed (step 235: Y), in step 240, the computing device may send a request for the additional data. For example, the computing device may determine that additional data would be helpful for determining a level of care of the property. As previously explained, an insurance company may dispatch the image capturing devices, such as a drone or a vehicle, used to capture images of the property (e.g., in step 205). The computing device may determine whether the image capturing device is still at the location of the property or within a threshold distance from the property. If so, the computing device may send a request to the image capturing device to capture additional images of the property (e.g., images at different angles, if some images were not sharp, a zoomed in image of a particular feature of the property, and the like). The image capturing device may transmit the newly captured images to the computing device. The additional data requested in step 240 may comprise any of the data, whether internal or external, described above (e.g., heat map images, maintenance or repair history, claims history, neighborhood characteristics, and the like). The computing device may return to step 235 to determine whether additional data is needed.

In step 245, the computing device may determine a level of care of structures on the property, such as houses, garages, sheds, high rises, porches, decks, and other structures. The computing device may make this determination based on any of the data received or otherwise determined in steps 210, 215, 220, 225, and 230 described above. In some aspects, the computing device may compare the data to baseline data, the baseline data indicating property that was properly taken care of. For example, a current image of a home may indicate discoloration on the side of the home. The computing device may compare the current image to a baseline image, and the baseline image might not include any discoloration. The discoloration may indicate water damage or that the home was not properly cared for. The baseline image may comprise an image of the home in question in the past (e.g., 2 years ago, 10 years ago, and the like).

As another example, a current thermal image of the home may indicate a certain level of energy loss of the home. The computing device may compare the level of energy loss of the home to a baseline level of energy loss. The baseline level of energy loss may be based on the energy loss of similar types of homes (e.g., town house, row house, detached house, rambler, bungalow, and the like), energy loss of homes in the same neighborhood as the property in question, or energy loss of the home in question in the past (e.g., 5 years ago or 10 years ago). If the energy loss of the home in question is higher than the baseline level, the computing device may determine that a full home inspection may be warranted. If, on the other hand, the energy loss of the home in question is lower than the baseline level, the computing device may determine that a virtual home inspection or no home inspection would be appropriate.

As yet another example, the computing device may compare the number of claims filed on the home in question versus the number of claims filed for similar types of homes or other homes in the neighborhood. Similarly, the computing device may compare the average number of claims filed on homes in the same neighborhood as the home in question to the average number of claims filed on homes in other neighborhoods. If more claims are filed on the home in question (or for homes in the neighborhood), the computing device may determine that a greater level of scrutiny of the home may be appropriate, such as via a full home inspection. The computing device may similarly compare the maintenance or repair history of the home to the maintenance or repair history of other similar homes.

The computing device may determine a score indicative of the level of care of structures on the property. The score may be based on a comparison of baseline data (e.g., baseline images, baseline claims, etc.) to data for the property in question. As a brief example, the baseline data may indicate that a model home has no discoloration, that the energy loss of the home is at a first (e.g., lowest) level, and that the number of claims filed (or hypothetically filed) on the model home every five years is 3 claims. The computing device may determine whether each of these three factors is satisfied by the data (e.g., image data or claim data) for the property in question. For example, image data for the property in question may indicate that a structure on the property has discoloration and that the energy loss of the structure is less than the energy loss of the baseline property. Claim data for the property in question may indicate that 2 claims were filed on the property in question in the last five years. Accordingly, the computing device may determine that the property in question satisfied two out of three of the factors related to the level of care of structures on the property. In some aspects, the computing device may apply a weight to each of the factors considered for determining the level of care, such that one or more factors are weighed more than one or more other factors.

In step 250, the computing device may determine a level of care of features on the property surrounding the structures (e.g., yards, garages, landscaping, sidewalks, and the like). The computing device may make this determination based on any of the data received or otherwise determined in steps 210, 215, 220, and 230 described above. In some aspects, the computing device may compare the data to baseline data, and the baseline data may be representative of a homeowner that took good care of the features on the property surrounding the structures.

As previously described, the baseline image may be a past image of the property (including the sidewalk or walkway), such as an image from 2 years ago, 5 years ago, etc. Alternatively, the baseline image may be an image of property similar to the property in question, such as properties in the same neighborhood (e.g., properties next door) or properties of the same type as the property in question (e.g., town houses, row house, etc.). For example, a baseline image may indicate that the sidewalk or walkway is clear of debris, does not have discoloration, is not overgrown with plants, and/or is painted. The computing device may compare a current image of the property to the baseline image and use image processing and feature recognition to determine whether the current image of the property indicates that the sidewalk or walkway is clear of debris, does not have discoloration, is not overgrown with plants, and/or is painted.

As another example, the computing device may compare an image of the yard of the property in question (e.g., backyard or front yard) to a baseline image of the yard. The baseline image of the yard may indicate that the yard is clean (e.g., is not being used to excessively store items, such as furniture, trash, or other debris). The baseline image may also identify a yard that has grass cut and bushes or other plants property trimmed. The baseline image may also identify any favorable landscaping features indicative of a good level of care of the property. The computing device may compare a current image of the property to the baseline image and use image processing and feature recognition to determine whether the current image of the property indicates that the yard is in good care relative to the baseline image of an ideal yard.

The computing device may determine a score indicative of the level of care of features on the property surrounding the structures. The score may be based on a comparison of baseline data (e.g., baseline images, etc.) to data for the property in question. As a brief example, the baseline data may indicate that a walkway of the property is clear of debris, the grass is cut to a certain length, and that there is no plant growth (e.g., vines) on a fence of the property. The computing device may determine whether each of these three factors is satisfied by the data (e.g., image data) for the property in question. For example, image data for the property in question may indicate that the walkway of the property has debris, the length of the grass is greater than the length of the grass in the baseline model, and that there are no vines on a fence of the property. Accordingly, the computing device may determine that the property in question satisfies one out of three of the factors related to the level of care of features on the property surrounding the structures. In some aspects, the computing device may apply a weight to each of the factors considered for determining the level of care, such that one or more factors are weighed more than one or more other factors.

In step 255, the computing device may determine a score for the property, and the score may indicate an overall level of care of the property. As will be described in further detail below, the computing device may use the score to determine the type of inspection to recommend for the property and/or whether to insure the property. The computing device may determine the score based on the level of care of the structures on the property (e.g., as determined in step 245)

and/or the level of care of the features on the property (e.g., as determined in step 250). For example, the computing device may combine each of the scores indicative of the level of care of structures and the level of care of the features surrounding the structures. The computing device may also apply a weight to each of these scores to, for example, place greater emphasis on the level of care of structures or greater emphasis on the level of care of the features surrounding the structures.

In some aspects, the computing device may determine the score based on individual factors, in addition to or as an alternative to, the scores for the level of care of the structures on the property and the level of care of the features surrounding the structures. The computing device may consider one or more factors related to the level of care of the buildings (e.g., whether the building has discoloration, the energy loss of the building, the number of claims filed on the building, etc.) and/or one or more factors related to the level of care of the features surrounding the buildings (e.g., whether a walkway of the property is clear of debris, whether the grass is cut to less than a certain length, whether there is any plant growth on a fence of the property, etc.). As previously described, the computing device may apply a weight to each of the factors considered for determining the property score.

In step 260, the computing device may determine whether to determine the value of the property, which may be used to determine the type of inspection to recommend for the property. The level of care of the property (e.g., indicated by one or more of the scores determined in steps 245, 250, and 255) may be combined with the value of the property to determine the type of inspection to recommend for the property. For example, the computing device may more readily recommend a full inspection for a property having a higher value than a property having a lower value. In some aspects, the computing device may use the captured images or other images of the property to estimate its value. The computing device may also determine an estimate of the property value based on captured images, and the estimated value may be used for purposes other than recommending a type of inspection. If the computing device determines to estimate the value of the property (step 260: Y), the computing device may proceed to perform one or more of the steps illustrated in FIG. 3.

Figure 3:
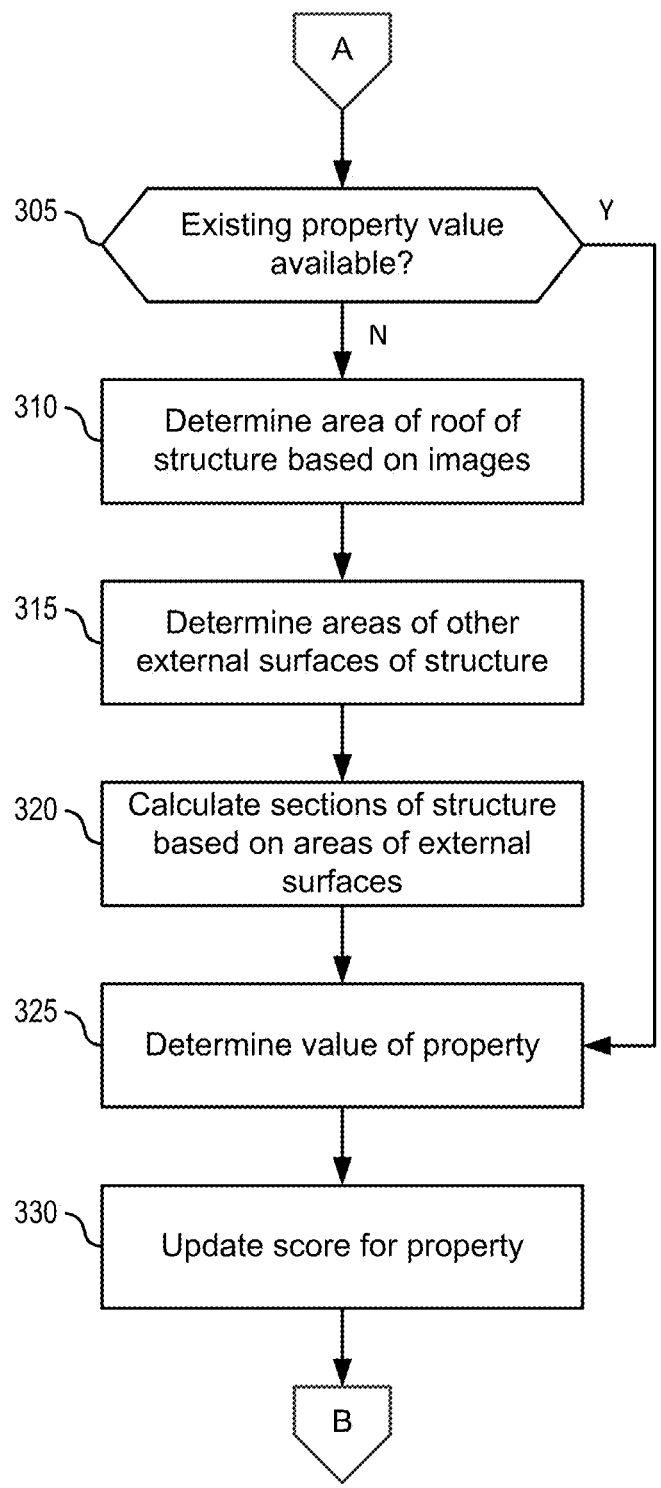
FIG. 3 is a flow diagram illustrating another example method of determining a type of property inspection and/or property value based on captured images according to one or more aspects of the disclosure.

FIG. 3 is a flow diagram illustrating another example method of determining a type of property inspection and/or property value based on captured images according to one or more aspects of the disclosure. The steps illustrated in FIG. 3 may be performed by one or more of the devices illustrated in FIG. 1, such as the property characteristic determination server 170.

In step 305, the computing device may determine whether an existing property value is available. Estimates of the property value may be available from an internal data source, such as if a previous estimate of the value of the property was made for insurance coverage. Estimates may also be available from external data sources, such as government real estate tax records, a web-based real estate company's database of property listings, an online property valuation system, or any other external data source. If an existing property value is available (step 305: Y), the computing device may proceed to step 325 and query internal data sources or send a request to external data sources for the property value. If an existing property value is not available or the computing device otherwise determines to generate an estimate based on images of the property (step 305: N), the computing device may proceed to step 310.

In step 310, the computing device may determine the area of the roof of a structure (e.g., a dwelling or other building) on the property based on captured images of the property. As previously described, the computing device may receive images taken from the top of the property, such as satellite images, drone images, airplane images, and the like. The computing device may determine the area (e.g., dimensions) of the roof based on the captured image. For example, the image data may comprise range data (e.g., from a range finder or scanner of the image capturing device), such as laser data, and the computing device may use the range data to determine the dimensions of the roof Additionally or alternatively, the computing device may compare the dimensions of the roof to a known dimension (or other baseline feature) in the captured image. For example, the computing device may have data indicating the dimensions of the roof of a neighboring building, and may determine the area of the building in question by comparing its size relative to the size of the roof of the neighboring building. The building in question and the neighboring building may be in the same captured image or different captured images.

In step 315, the computing device may determine the areas of other external surfaces of the structure, such as each of the outside walls (e.g., front wall, back wall, and each of one or more side walls). As previously described, the computing device may receive images taken from the side of the property, such as images captured from a vehicle driving on the street, drone images, images captured by a robot at the property, images captured by a person, and the like. As previously explained, the computing device may determine the dimensions of the outside walls using data from a range finder and/or by comparing the size of the outside wall to the size of neighboring walls (which may be known).

In some aspects, the computing device may determine the location of eaves of the home to identify boundaries of the roof and/or boundaries of other external surfaces. For example, the computing device may use image recognition processing to identify the eaves. The boundaries may be used to determine the area described above with respect to step 310 and 315. The computing device might not use information for some external surfaces to determine their areas. For example, for a rectangular-shaped building, the computing device may use an image of the roof, an image of the back wall of the building, and an image of the front wall of the building to determine the length of the side walls of the building, which might be more difficult to photograph.

In step 320, the computing device may calculate or otherwise determine sections of the structure (e.g., internal sections, such as levels or rooms) based on the areas of the external surfaces, such as the roof. For example, the computing device may determine the square footage of each level of the structure based on the area of the roof (e.g., is equal to the calculated area of the roof plus or minus an adjustment amount). The computing device may determine the number of levels of the structure based on the images of the outside walls. For example, the computing device may determine that the structure has a certain number of levels (e.g., 2) if the height of the structure, from an external image of the structure, is between a first threshold height (e.g., 20 feet) and a second threshold height (e.g., 28 feet). As another example, the computing device may determine that the structure has 3 levels if the height of the structure is between 28 feet and 42 feet. Various other thresholds may be used to determine the number of levels of the structure. The computing device may additionally or alternatively use image recognition to identify windows on an image of the side of the structure, and count the number of windows identified to determine the number of levels. In some aspects, the computing device may retrieve data identifying the number of levels from external sources, such as web-based real estate listings, tax records databases, and the like. The square footage calculation may include or exclude some enclosed structures, such as garages and sheds.

In step 325, the computing device may determine a value of the property (e.g., a replacement cost of the property). As described with reference to step 305, the computing device may determine the value of the property based on internal or external data sources if the data is available. If not, the computing device may determine an estimate of the value of the property based on the areas and sections of the building determined in steps 310, 315, and/or 320. The computing device may determine the value of the property based on the square footage, which may be determined from images as described above. For example, the neighborhood that the property in question is located in or the type of the property in question may have an associated price per area (e.g., $/sq. ft.). The computing device may multiply the price per area with the square footage of the building to determine the value of the property in step 325.

In step 330, the computing device may update the score, such as the score determined in step 255, for the property based on the determined value of the property. The score may be updated such that the computing device is more likely to generate a recommendation for a full inspection for higher value properties (e.g., having values greater than a threshold). Similarly, the score may be updated such that the computing device is more likely to generate a recommendation for a partial (e.g., virtual) inspection or no inspection for lower value properties (e.g., having values lower than a threshold). The computing device may proceed to step 265, as illustrated in FIG. 2.

In step 265, the computing device may determine a recommendation for the type of inspection to perform for the property. The recommendation may be based on one or more of the scores described above with respect to steps 245, 250, 255 and 330 and/or based on the value of the property determined in step 325. In other words, the recommendation may be based on a determination of whether the homeowner has taken good care of the home and/or based on the value of the property, which may in turn be determined based on one or more images or other data for the property. The recommendation may comprise, for example, a recommendation for a full inspection (e.g., an outdoor and an indoor inspection), a partial inspection (e.g., a virtual inspection, a curbside inspection, an outdoor inspection, an inspection based on publicly available data or data already available to the insurer, and the like), or no inspection. Based on the inspection, the computing device may determine whether to provide insurance coverage for the property and/or generate a quote for insuring the property.

In step 270, the computing device may generate one or more user interface indicating the recommendation for the type of inspection to perform. For example, the user interface(s) may indicate the determined recommendation (e.g., partial inspection, full inspection, no inspection, etc.).

In step 275, the computing device may send the recommendation and/or the user interface indicating the recommendation for display on a display device. For example, the user interface having the recommendation may be displayed on a display of a user device, such as a workstation, a mobile phone, a tablet, a laptop, or any other user device having a display. The user of the user device may use the displayed recommendation to determine the type of inspection to perform, whether to insure the property, and/or the insurance premium (e.g., by calculating a replacement cost for the property, which may affect the insurance premium of the property).

In some aspects, an automated image capturing device (e.g., a drone, a robot, and the like) may be at the location of the property, and may have captured the initial images of the property (e.g., as described with reference to step 205). A location of the image capturing device may be controlled by the computing device in order to, in some arrangements, facilitate an inspection or portion of an inspection. For instance, before the image capturing device is instructed to leave the location of the property, the computing device may determine the recommendation for the type of inspection for the property. In step 275, the computing device may send the recommendation to the image capturing device before the image capturing device leaves the location of the property and may instruct the image capturing device to remain at the location of the property. The image capturing device may capture one or more additional images of the property and send the additional images to the computing device. After receiving one or more additional images from the image capturing device, the computing device may determine whether to send a request to the image capturing device to capture more images of the property. If not, the computing device may send an instruction to the image capturing device to leave the location of the property (e.g., return to a home base, go to another property location, etc.). The computing device may determine the location of the image capturing device using, for example, GPS, cellular network, or other wireless sensors of the image capturing device.

If, for example, the computing device transmits a recommendation for a partial inspection (e.g., a virtual inspection, or a curbside instruction), the image capturing device may capture one or more additional images of the property as part of the partial inspection. The image capturing device may similarly capture additional images as part of a full inspection. However, additional inspections of the interior of buildings on the property may also be performed. If the image capturing device is instructed not to perform an inspection, the image capturing device may leave the location of the property.

In some aspects, a user having a user device (e.g., a camera, a smartphone, a tablet, etc.) may be at the location of the property, and may have captured the initial images of the property with the user device or another image capturing device (e.g., as described with reference to step 205). Before the user leaves the location of the property, the computing device may determine the recommendation for the type of inspection for the property. In step 275, the computing device may send the recommendation (and/or the generated user interface) to the user device before the user leaves the location of the property. The computing device may determine the location of the user device using, for example, GPS, cellular network, or other wireless sensors of the user device.

The recommendation received from the computing device may be displayed on a display of the user device. The user may capture one or more additional images of the property as part of a partial inspection or a full inspection. For a full inspection, the user may also be instructed, via the user device, to inspect the interior of building(s) on the property, such as by performing a physical inspection and/or capturing images of the interior of the building(s).

Figure 4:
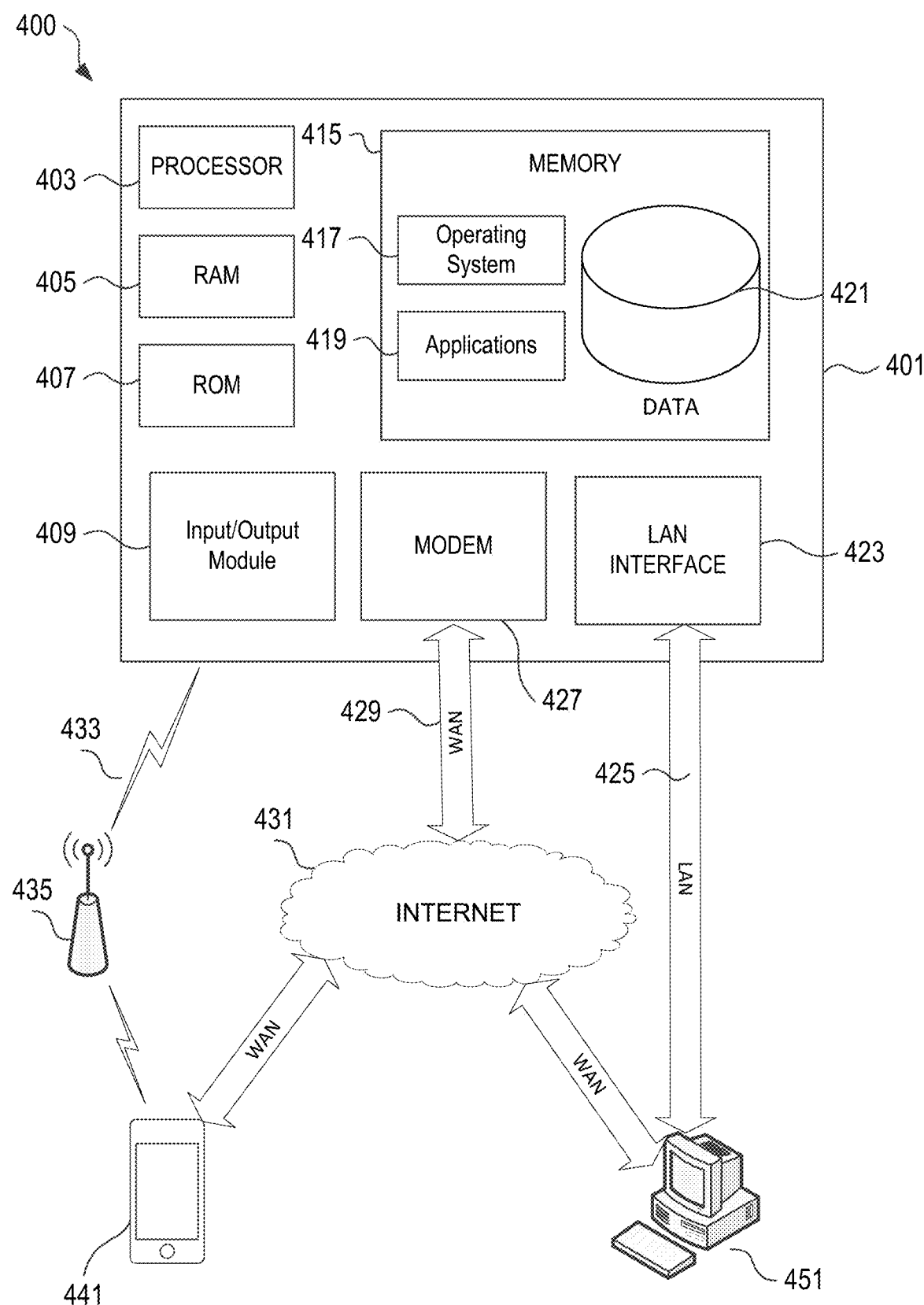
FIG. 4 illustrates a network environment and computing systems that may be used to implement aspects of the disclosure.

FIG. 4 illustrates a block diagram of a computing device 401 in a property inspection and property value determination system 400 that may be used according to one or more illustrative embodiments of the disclosure. The computing device 401 may have a processor 403 for controlling overall operation of the computing device 401 and its associated components, including RAM 405, ROM 407, input/output module 409, and memory unit 415. The computing device 401, along with one or more additional devices (e.g., terminals 441, 451) may correspond to any of multiple systems or devices, such as property inspection and property value determination devices or systems, configured as described herein for receiving data from image capturing devices, mobile devices, and external data sources, and/or using the data to determine a type of property inspection to recommend and the value of the property.

Input/Output (I/O) module 409 may include a microphone, keypad, touch screen, and/or stylus through which a user of the computing device 401 may provide input, and may also include one or more of a speaker for providing audio input/output and a video display device for providing textual, audiovisual and/or graphical output. Software may be stored within memory unit 415 and/or other storage to provide instructions to processor 403 for enabling device 401 to perform various functions. For example, memory unit 415 may store software used by the device 401, such as an operating system 417, application programs 419, and an associated internal database 421. The memory unit 415 includes one or more of volatile and/or non-volatile computer memory to store computer-executable instructions, data, and/or other information. Processor 403 and its associated components may allow the computing device 401 to execute a series of computer-readable instructions to receive data from image capturing devices, mobile devices, and external data sources, and/or using the data to determine a type of property inspection to recommend and the value of the property.

The computing device 401 may operate in a networked environment 400 supporting connections to one or more remote computers, such as terminals/devices 441 and 451. The computing device 401, and related terminals/devices 441 and 451, may include devices installed in ground, air, or space vehicles or mobile devices that are configured to receive and process image and external data. Thus, the computing device 401 and terminals/devices 441 and 451 may each include personal computers (e.g., laptop, desktop, or tablet computers), servers (e.g., web servers, database servers), vehicle-based devices (e.g., on-board vehicle computers, short-range vehicle communication systems, sensors and telematics devices), or mobile communication devices (e.g., mobile phones, portable computing devices, and the like), and may include some or all of the elements described above with respect to the computing device 401. The network connections depicted in FIG. 4 include a local area network (LAN) 425 and a wide area network (WAN) 429, and a wireless telecommunications network 433, but may also include other networks. When used in a LAN networking environment, the computing device 401 may be connected to the LAN 425 through a network interface or adapter 423. When used in a WAN networking environment, the device 401 may include a modem 427 or other means for establishing communications over the WAN 429, such as network 431 (e.g., the Internet). When used in a wireless telecommunications network 433, the device 401 may include one or more transceivers, digital signal processors, and additional circuitry and software for communicating with wireless computing devices 441 (e.g., mobile phones, short-range vehicle communication systems, vehicle sensing and telematics devices) via one or more network devices 435 (e.g., base transceiver stations) in the wireless network 433.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, Wi-Fi, and WiMAX, is presumed, and the various computing devices and property inspection and value system components described herein may be configured to communicate using any of these network protocols or technologies.

Additionally, one or more application programs 419 used by the computing device 401 may include computer executable instructions (e.g., property inspection type or property value determination algorithms, and the like) for receiving data from image capturing devices, mobile devices, and external data sources, and/or using the data to determine a type of property inspection to recommend and the value of the property.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

What is claimed is:

1. A method comprising:
    receiving, from an automated image capturing device, one or more thermal images one or more images of a property, the one or more images including one or more thermal images;
    determining one or more heat map images for the property using the one or more thermal images;
    determining a level of energy loss of the property using the one or more heat map images;
    determining a level of care of one or more structures disposed on the property by comparing the level of energy loss to a baseline level of energy loss;
    determining a score using the level of care of the one or more structures;
    determining a value of the property using the one or more thermal images;
    determining a recommendation for a type of inspection for the property using the score and the value of the property, the type of inspection for the property including at least one of a full inspection for the property, a partial inspection for the property, or no inspection for the property;
    generating, automatically using the recommendation, an instruction to control the automated image capturing device to perform one or more actions, the one or more actions including at least one of obtaining one or more additional images of the property, remain at the property, or leave the property; and
    transmitting the instruction to the automated image capturing device, the instruction to cause the automated image capturing device to perform the one or more actions.

2. The method of claim 1, wherein the automated image capturing device includes a camera and is disposed on at least one of a road vehicle, a traffic light, an aerial vehicle, or a space vehicle.

3. The method of claim 1, wherein the one or more images of the property are captured from one or more of a top of the property, a side of the property, and a front of the property.

4. The method of claim 1, wherein the one or more thermal images include one or more infrared images.

5. A system comprising:
a computing device comprising:
   a communication interface;
   a processor; and
   memory storing computer-executable instructions that, when executed by the processor, cause the processor of the computing device to:
      receive, via the communication interface from an automated image capturing device, one or more images of a property, the one or more images including one or more thermal images;
      determine one or more heat map images for the property using the one or more thermal images;
      determine a level of energy loss of the property using the one or more heat map images;
      determine a level of care of one or more structures on the property by comparing the level of energy loss to a baseline level of energy loss;
      determine a score based on the level of care of the one or more structures;
      determine a value of the property using the one or more images;
      determine a recommendation for a type of inspection for the property using the score and the value of the property, the type of inspection for the property including at least one of a full inspection for the property, a partial inspection for the property, or no inspection for the property;
      generate, automatically and based on the recommendation, an instruction to control the automated image capturing device to perform one or more actions, the one or more actions including at least one of obtaining one or more additional images of the property, remain at the property, or leave the property; and
      transmit, via the communication interface to the automated image capturing device, the instruction to cause the automated image capturing device to perform the one or more actions.

6. The system of claim 5, wherein the automated image capturing device includes a camera and is disposed on at least one of a road vehicle, a traffic light, an aerial vehicle, or a space vehicle.

7. The system of claim 5, wherein the one or more images of the property are captured from one or more of a top of the property, a side of the property, and a front of the property.

8. The system of claim 5, wherein the one or more thermal images include one or more infrared images.

9. A non-transitory computer readable medium storing instructions that, when read by a computing device, cause the computing device to:
   receive, from an automated image capturing device, one or more images of a property, the one or more images including one or more thermal images;
   determine one or more heat map images for the property using the one or more thermal images;
   determine a level of energy loss of the property using the one or more heat map images;
   determine a level of care of one or more structures on the property by comparing the level of energy loss to a baseline level of energy loss;
   determine a score based on the level of care of the one or more structures;
   determine a value of the property using the one or more thermal images;
   determine a recommendation for a type of inspection for the property using the score and the value of the property, the type of inspection for the property including at least one of a full inspection for the property, a partial inspection for the property, or no inspection for the property;
   generate, automatically and based on the recommendation, an instruction to control the automated image capturing device to perform one or more actions, the one or more actions including at least one of obtaining one or more additional images of the property, remain at the property, or leave the property; and
   transmit, via a communication interface to the automated image capturing device, the instruction to cause the automated image capturing device to perform the one or more actions.

10. The non-transitory computer readable medium of claim 9, wherein the automated image capturing device includes a camera and is disposed on at least one of a road vehicle, a traffic light, an aerial vehicle, or a space vehicle.

11. The non-transitory computer readable medium of claim 9, wherein the one or more images of the property are captured from one or more of a top of the property, a side of the property, and a front of the property.

12. The non-transitory computer readable medium of claim 9, wherein the one or more thermal images include one or more infrared images.

* * * * *